(12) United States Patent
Johnson et al.

(10) Patent No.: US 9,020,817 B2
(45) Date of Patent: Apr. 28, 2015

(54) USING SPEECH TO TEXT FOR DETECTING COMMERCIALS AND ALIGNING EDITED EPISODES WITH TRANSCRIPTS

(71) Applicants: R Paul Johnson, Burlington, MA (US); Raymond Lau, Charlestown, MA (US)

(72) Inventors: R Paul Johnson, Burlington, MA (US); Raymond Lau, Charlestown, MA (US)

(73) Assignee: Ramp Holdings, Inc., Woburn, MA (US)

( * ) Notice: Subject to any disclaimer, the term of this patent is extended or adjusted under 35 U.S.C. 154(b) by 286 days.

(21) Appl. No.: 13/744,585

(22) Filed: Jan. 18, 2013

(65) Prior Publication Data

US 2014/0207449 A1  Jul. 24, 2014

(51) Int. Cl.
*G10L 15/26* (2006.01)
*G10L 15/00* (2013.01)
*G11B 27/00* (2006.01)

(52) U.S. Cl.
CPC .............. *G10L 15/26* (2013.01); *G11B 27/00* (2013.01)

(58) Field of Classification Search
USPC .................................. 704/231–257
See application file for complete search history.

(56) References Cited

U.S. PATENT DOCUMENTS

| 8,564,721 B1 * | 10/2013 | Berry et al. ............ 348/515 |
| 2003/0050926 A1 * | 3/2003 | Agnihotri et al. ............ 707/5 |
| 2007/0106494 A1 * | 5/2007 | Detlef et al. ............ 704/9 |
| 2011/0145002 A1 * | 6/2011 | Melamed et al. ............ 704/278 |
| 2011/0239107 A1 * | 9/2011 | Phillips et al. ............ 715/234 |
| 2013/0077805 A1 * | 3/2013 | Kirsch ............ 381/119 |

* cited by examiner

*Primary Examiner* — Jesse Pullias
(74) *Attorney, Agent, or Firm* — Chapin IP Law, LLC

(57) ABSTRACT

Methods and apparatus, including computer program products, for using speech to text for detecting commercials and aligning edited episodes with transcripts. A method includes, receiving an original video or audio having a transcript, receiving an edited video or audio of the original video or audio, applying a speech-to-text process to the received original video or audio having a transcript, applying a speech-to-text process to the received edited video or audio, and applying an alignment to determine locations of the edits.

22 Claims, 3 Drawing Sheets

200

Receive an edited video clip to be
aligned with closed captions along with a start time
202
▼
Receive an original video clip associated with closed captions
204
▼
Determine the locations of the edits
206
▼
Determine a candidate closed caption
text for the edited video clip
208
▼
Apply a speech-to-text process on
the edited video clip
210
▼
Apply a speech-to-text process to
the candidate closed caption text
212
▼
Execute a best alignment of the
candidate closed caption text
output to the speech-to-text output
214
▼
Identify likely boundaries using the islands
216
▼
Output the aligned video clip to closed caption file
218

FIG. 3

USING SPEECH TO TEXT FOR DETECTING COMMERCIALS AND ALIGNING EDITED EPISODES WITH TRANSCRIPTS

BACKGROUND OF THE INVENTION

The invention generally relates computer systems and computer executed methods for using speech to text for detecting commercials and aligning edited episodes with transcripts.

In general, video clips are short clips of video, usually part of a longer recording. If video clips originate from broadcast video content (e.g., over-the-air, cable, satellite, and so forth), there is frequently closed captioning associated with the broadcast and commercials. In general, closed captioning is the process of displaying text on a television, video screen or other visual display to provide additional or interpretive information to individuals who wish to access it. Closed captions typically show a transcription of the audio portion of a program as it occurs (either verbatim or in edited form), sometimes including non-speech elements.

Making video clips on the web, on smart phones, and so forth, matched up to the relevant closed caption text is less expensive than human transcription and yields better results than purely automated speech-to-text methods as the closed caption files were generated by a human. However, typically the closed caption will not exactly match the spoken words, it is usually quite different as the closed captioner focuses on important words, s/he makes mistakes, and so forth.

The closed caption also lags the broadcast video as the close captioner needs to watch/hear the video and then input the corresponding closed caption. This lag varies. For pre-recorded (as opposed to live) content, there may be no lag at all because the lag was already edited out. If one uses an automated technique, such as speech-to-text, to generate words from the video clip to assist in an alignment process, there will often be recognition errors. A variability in lag along with the errors in both the closed caption text and speech-to-text make alignment complicated.

In addition, many media broadcasters do not have the closed caption text readily available, so frequently, one needs to capture closed captions from a live broadcast stream.

Further, sometimes commercials are closed captioned and other times they are not. Thus, if a media company desires to take an edited version of a broadcast, with commercials removed, and align it with the original broadcast having commercials, time gaps and whether the commercials are closed captioned or not present many complications.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for using speech to text for detecting commercials and aligning edited episodes with transcripts.

In general, in one aspect, the invention features a method including, in a computer system having a processor and a memory, receiving an original video or audio having a transcript, receiving an edited video or audio of the original video or audio, applying a speech-to-text process to the received original video or audio having a transcript, applying a speech-to-text process to the received edited video or audio, and applying an alignment to determine locations of the edits.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 3 is a flow diagram.

DETAILED DESCRIPTION

Figure 1:
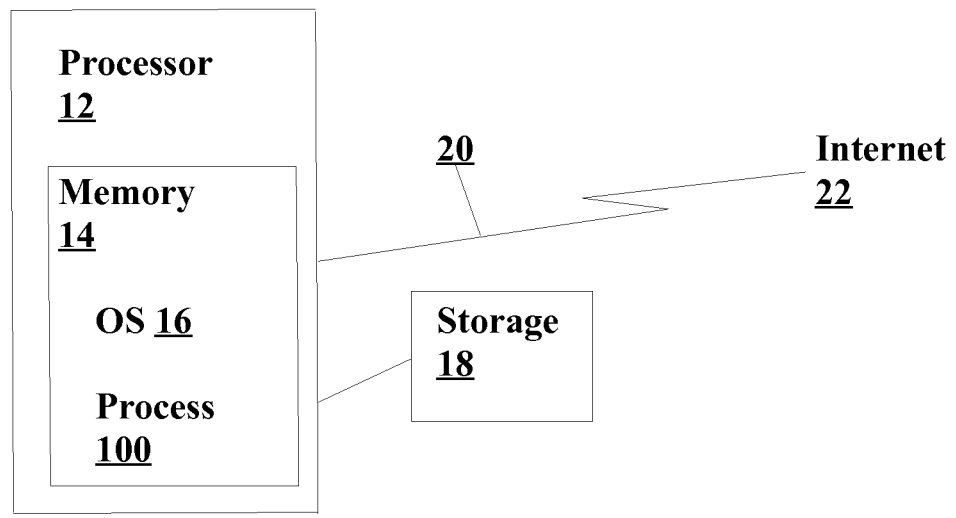
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, a system 10 includes a processor 12 and memory 14. Memory 14 includes an operating system (OS) 16, such as Linux®, Snow Leopard® or Windows®, and a process 100 for using speech to text for detecting commercials and aligning edited episodes with transcripts. The transcripts may come from the closed-captions or from other sources. While we focus the discussion on transcripts and closed-captions, the present invention can also be applied to other metadata associated with the video or audio, for example, director's commentary, scene descriptions, and so forth. The system 10 may include a storage device 18 and a communications link 20 to a network of interconnected computers 22 (e.g., the Internet). Process 100, fully described below, executes speech to text on both an original un-edited video and the edited video. Then by aligning and comparing recognized word outputs, process 100 can identify which segments exist in the original un-edited video but not in the edited video. Though the editing may change the exact words recognized at each time location, there is enough similarity in the overall recognition to perform this match.

It should be noted that closed captions as described herein can be any source of word transcription. Further, a commercial can generally refer to other segments deleted from the edited video.

Figure 2:
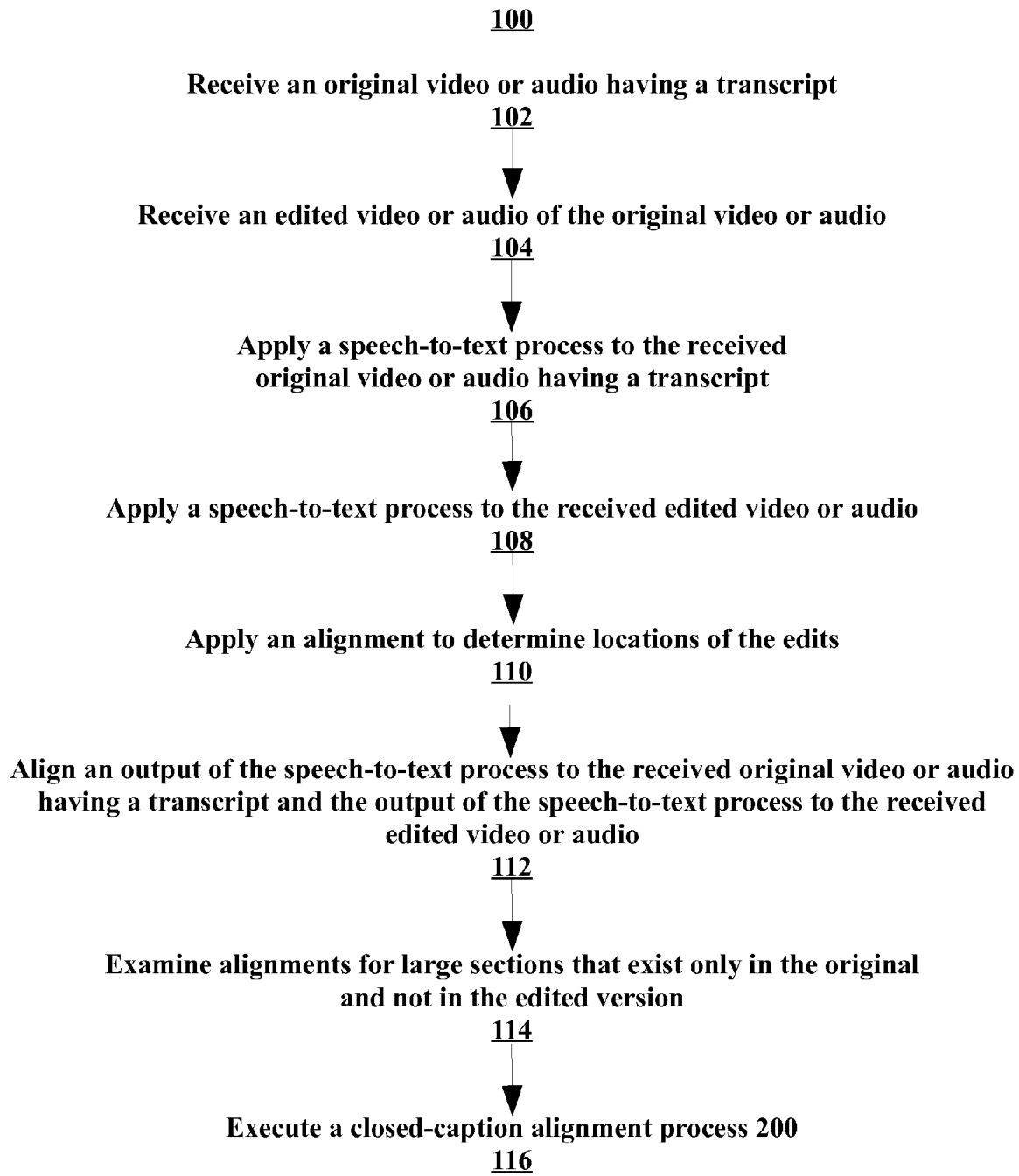
FIG. 2 is a flow diagram.

As shown in FIG. 2, the process 100 for using speech to text for detecting commercials and aligning edited episodes with transcripts includes receiving (102) an original video or audio having a transcript. Process 100 receives (104) an edited video or audio of the original video or audio.

Process 100 applies (106) a speech-to-text process to the received original video or audio having a transcript.

Process 100 applies (108) a speech-to-text process to the received edited video or audio.

Process 100 applies (110) an alignment to determine locations of the edits.

Process 100 aligns (112) an output of the speech-to-text process to the received original video or audio having a transcript and the output of the speech-to-text process to the received edited video or audio. The alignment (112) a text alignment can using various techniques, such as, for example, dynamic programming to minimize a metric calculated from the number of substitutions, insertions, deletions.

Process 100 examines (114) alignments for large sections that exist only in the original and not in the edited version. Those are the detected edits (typically commercials). This can involve looking at a sliding window centered around a putative commercial start/end point and considering the accuracy within the window to the left verses to the right of the putative start/end point. The accuracy can also take into account confidence scores from the speech to text output. Process 100 can also have minimum/maximum length restrictions on detected commercials.

A finite state machine can also be used to assist, for example, process 100 might look for multiple potential commercial start boundaries before declaring that a start boundary actually exists. More simply, process 100 would not allow a commercial start unless it is not already in a commercial, conversely, process 100 might not allow a commercial end unless it is already inside a commercial.

Looking at the time stamps to the left and right of the putative commercial can be very effective in filtering out false positives (because the timeline must include removed material).

Rule based logic involving multiple of these criteria can be used for a more robust determination. Similarly, a statistically trained classifier or other machine learning system might be used.

For each pair of segments of the remaining segments aside from the commercials in the original, and the corresponding segments in the edited version, process 100 executes (116) a closed-caption alignment process 200.

It should be noted that when text is aligned, process 100 involves correct matches, substitutions, insertions and deletions. The following is one example.

Reference: The rain in Spain stays mainly in the plains
Hypothesis: rain near Spain stays mainly mostly in the plains
D C S C C C I C C C
where C=Correct, S=Substitution, I=Insertion, and D=Deletion, all relative to the reference text. In the hypothesis text above, "The" is deleted, "near" is substituted for "in," "mostly" is inserted and the remaining text is correct.

As shown in FIG. 3, the closed-caption alignment process 200 includes receiving (202) an edited video clip to be aligned with closed captions along with a start time. Closed captions can include subtitles, subtext, a summary that is approximately contemporaneous with the words spoken, and verbal descriptions of what's happening in the video but not actually spoken.

Process 200 receives (204) an original video clip associated with closed captions.

Process 200 determines (206) the locations of the edits.

Process 200 determines (208) a candidate closed caption text for the edited video clip by taking the closed captions from the original video clip and considering the locations of the edits.

Process 200 executes (210) a speech-to-text process on the edited video clip.

Process 200 executes (212) a speech-to-text process to the candidate closed caption text.

Process 200 executes (214) a best alignment of the candidate closed caption text output to the speech-to-text output. The best alignment can use one of numerous techniques, such as, for example, dynamic programming algorithms to minimize the number of mismatches. Certain error types may be considered worse than others in a scoring. Some words or word patterns might may be given a penalty of zero if, for example, they are likely to be omitted from the closed caption.

Sequences within the alignment that "match well" form islands. Matching well may be determined by criteria including, for example, contiguous matches, contiguous matches except for certain types of errors like insertions and deletions, allowing for a small ratio of errors, such as up to one in every four contiguous words, and so forth. Alternatively, process 200 can rank the sentences by the number of matching words in each sentence and consider the top N to form islands, where M may be 1. It should be noted that "sentence" may not necessarily be a linguistic sentence, but may be one selected by the speech to text process (e.g., a pause during speech may be labeled as a sentence boundary by speech to text).

Process 200 identifies (216) likely boundaries using the islands. For example, consider a 10 minute video clip. If the largest island corresponds to time 1 m 0 s to 8 m 0 s (2 m 0 s from the end) in the video clip and time 2 m 0 s to time 9 m 0 s in the candidate closed caption file, the likely start/end boundaries are 1 m 0 s and 11 m 0 s in the closed caption file (because we started 1 m 0 s from start of clip and ended 2 m 0 s from end of clip, so those offsets are added to the island.

Process 200 can perform one or more passes in identifying islands and boundaries, and may add some padding to the boundaries to allow for slight errors. Process 100 may use either word or sentence time stamps from the speech-to-text transcript for boundaries identification.

In some passes, process 200 may take boundaries identified in a previous pass, and move the end points identified in a previous pass by finding very near islands matching a minimum criteria, as opposed to maximizing the island size. For example, in pass 1, process 100 may find the largest island to infer candidate end points, and then in pass 2, process 100 may adjust the end points by finding the location of the nearest three word match. This three word match may permit skipping over certain errors, such as insertions and deletions. Thus, a three word match excluding insertions and deletions becomes the minimum criteria in this example.

A common pattern is that a headline is repeated twice, both as an introductory prelude, and later in the video clip itself. For example, the closed caption may have "Coming up next: Does it pay to play it safe in this economy? <intervening words> We asked the question does it pay to play it safe in this economy? . . . " with the actual clip starting at "We asked the question . . . " Multiple passes are particularly useful for eliminating the introductory prelude in the first pass, and later to refine the location of the boundaries.

Once process 200 has determined a final set of candidate end point boundaries, process 200 takes the corresponding portion of the closed caption file and outputs (218) final closed captions aligned to the video clip.

Process 200 may further perform a sentence level or word level realignment of a final portion of the closed caption file and the video clip to output a fully aligned closed caption to the video clip data structure.

If the final alignment error rate is too high or if any of the passes should fail, process 200 can label the alignment as having failed instead of returning a low quality alignment.

In another embodiment, speech-to-text to replaced by audio fingerprinting, e.g., a reduced-bit representation or other identifier of a media signal (e.g., audio, video or still images). One such method includes receiving a partial fingerprint of a media signal, wherein the partial fingerprint is derived from the media signal itself, the partial fingerprint being computed a first location, processing the partial fingerprint to obtain a more refined fingerprint, relative to the partial fingerprint, the act of processing occurring at a second location that is remote from the first location, and based at least in part of the refined fingerprint, identifying the media signal or information associated with the media signal.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices, magnetic disks, e.g., internal hard disks or removable disks, magneto optical disks, and CD ROM and DVD-ROM disks. The processor and the memory can be supplemented by, or incorporated in special purpose logic circuitry.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A method comprising:
in a computer system having a processor and a memory, receiving an original video or audio having a transcript;
receiving an edited video or audio of the original video or audio;
applying a speech-to-text process to the received original video or audio having a transcript;
applying a speech-to-text process to the received edited video or audio; and
applying an alignment to determine locations of the edits.

2. The method of claim 1 further comprising:
aligning an output of the speech-to-text process to the received original video or audio having a transcript and the output of the speech-to-text process to the received edited video or audio;
examining alignments for large sections that exist only in the original and not in the edited version; and
for each pair of segments of the remaining segments aside from the commercials in the original, and the corresponding segments in the edited version, executing a closed-caption alignment process.

3. The method of claim 1 wherein the output of the speech-to-text process to the received original video or audio having a transcript and the output of the speech-to-text process to the received edited video or audio include timestamps.

4. The method of claim 1 wherein the transcript is derived from closed-captioning.

5. The method of claim 1 wherein the transcript is derived from metadata associated with the video or audio.

6. The method of claim 5 wherein the metadata comprises director's commentary.

7. The method of claim 5 wherein the metadata comprises scene descriptions.

8. The method of claim 1 wherein the original video or audio is selected from the group consisting of broadcast media, cable media and satellite media.

9. The method of claim 2 wherein aligning comprises performing a match on words with dynamic programming.

10. The method of claim 2 wherein aligning comprises performing a match on words minimizing an error metric.

11. The method of claim 10 wherein the error metric comprises a number of substitutions, insertions and deletions.

12. The method of claim 2 wherein examining comprises considering each position as a putative commercial boundary and looking at an accuracy within a window before/after the putative commercial boundary.

13. The method of claim 12 wherein an accuracy is derived from a combination of one or more of the number of correct, substitutions, insertions, and deletions.

14. The method of claim 2 wherein examining comprises using multiple window sizes.

15. The method of claim 2 wherein examining comprises using finite state machine logic.

16. The method of claim 2 wherein examining comprises using statistical classification or other machine learning.

17. The method of claim 2 wherein examining comprises imposing minimum or maximum length restrictions.

18. The method of claim 2 wherein examining comprises using confidence scores.

19. The method of claim 2 wherein examining comprises looking at time stamps to a left and a right.

20. The method of claim 2 further comprising performing closed-captioning alignment using the detected commercials to cut the original and edited media into segments to be aligned.

21. The method of claim 1 wherein applying a speech-to-text process to the received original video or audio having the transcript is replaced with audio fingerprinting the received original video or audio having the transcript.

22. The method of claim 1 wherein applying a speech-to-text process to the received edited video or audio is replaced with audio fingerprinting the received edited video or audio.

* * * * *